United States Patent
So

(10) Patent No.: US 6,307,330 B1
(45) Date of Patent: Oct. 23, 2001

(54) SYSTEM AND METHOD FOR OPERATING INCANDESCENT LAMPS WITH HIGH VOLTAGE SOURCE

(75) Inventor: Lingkon So, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/558,263

(22) Filed: Apr. 25, 2000

(51) Int. Cl.[7] .................................................. G05F 1/00
(52) U.S. Cl. ....................... 315/291; 315/307; 315/224; 315/82; 315/78
(58) Field of Search ..................... 315/291, 307, 315/224, 311, 77, 78, DIG. 4; 307/10.1, 10.8

(56) References Cited

U.S. PATENT DOCUMENTS

| | | | |
|---|---|---|---|
| Re. 35,428 | 1/1997 | Wilhelm | 307/10.8 |
| 4,309,639 | 1/1982 | Thrower, Jr. et al. | 315/82 |
| 4,841,198 | 6/1989 | Wilhelm | 315/82 |
| 4,845,465 | 7/1989 | Kruse et al. | 340/468 |
| 4,902,958 | 2/1990 | Cook, II | 323/282 |
| 5,015,918 * | 5/1991 | Copeland | 315/76 |
| 5,053,677 | 10/1991 | Sanner et al. | 315/77 |
| 5,182,503 | 1/1993 | Denneman et al. | 315/224 |
| 5,293,077 | 3/1994 | Seki et al. | 307/10.8 |
| 5,343,122 * | 8/1994 | Sugimori et al. | 315/209 R |
| 5,373,215 * | 12/1994 | Steinkraus, Jr. | 315/200 R |
| 5,404,094 | 4/1995 | Green et al. | 323/282 |
| 5,517,064 | 5/1996 | Murakami | 307/10.1 |

\* cited by examiner

*Primary Examiner*—Haissa Philogene
(74) *Attorney, Agent, or Firm*—Carlos L. Hanze

(57) ABSTRACT

A system and method is provided for operating incandescent lamps with a high voltage source in a motor vehicle. The system includes at least one pulse width modulation circuit having an incandescent lamp electrically connected to a high voltage source. The system also includes a generator electrically connected to the at least one pulse width modulation circuit for generating a pulse width modulation signal to modulate a voltage of the high voltage source to a voltage rating of the incandescent lamp.

20 Claims, 1 Drawing Sheet

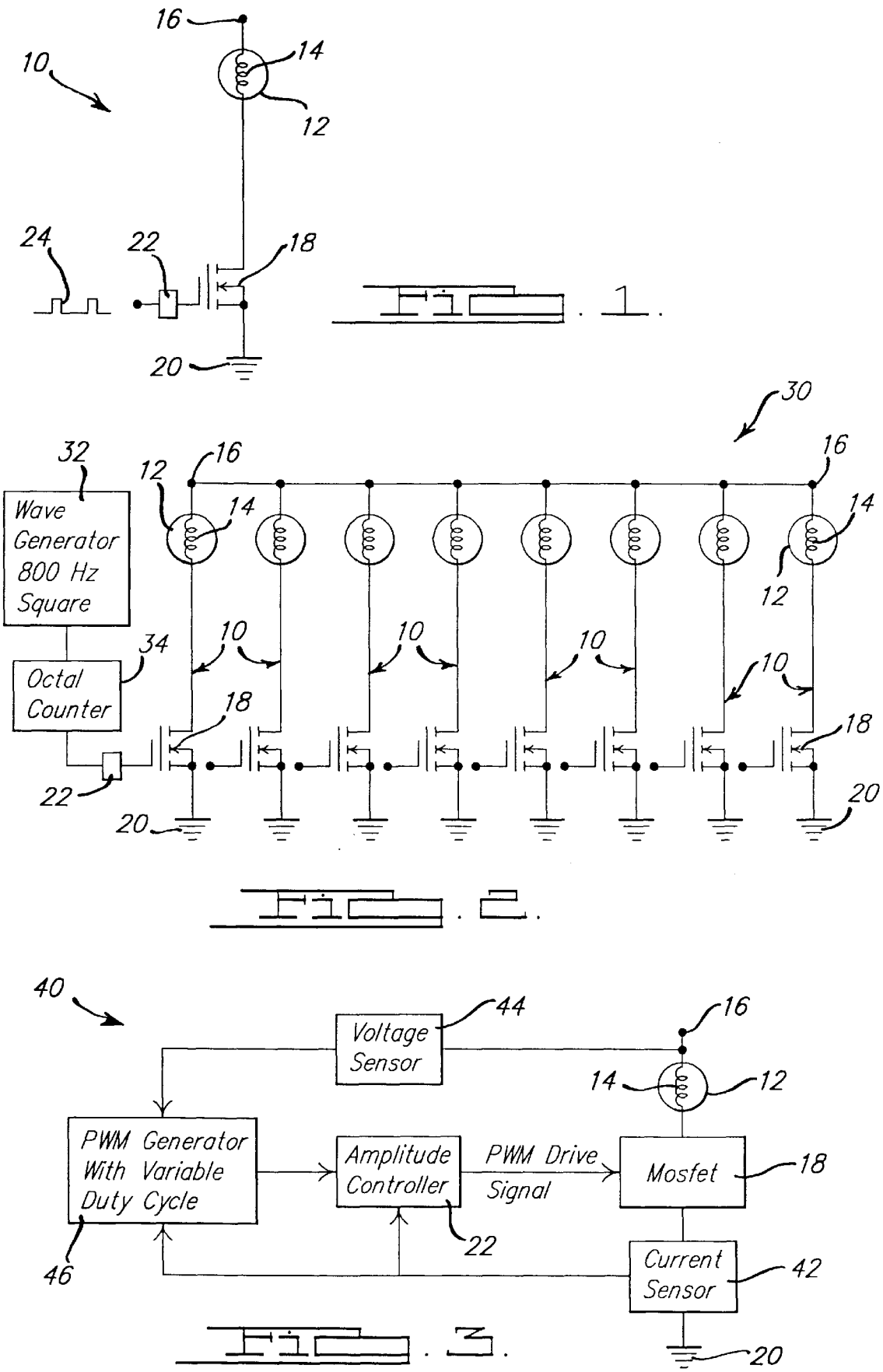

SYSTEM AND METHOD FOR OPERATING INCANDESCENT LAMPS WITH HIGH VOLTAGE SOURCE

BACKGROUND OF THE INVENTION

1. Field of the Invention

The present invention relates generally to incandescent lamps for motor vehicles and, more specifically, to a system and method for operating designed-for low voltage incandescent lamps with a high voltage source for a motor vehicle.

2. Description of the Related Art

Electrical loads in vehicles such as motor vehicles are increasing to a point that in the future the present twelve volt (12v) system may not be sufficient. There is a consensus of opinion that higher system voltage is needed to meet future electrical loads. The voltage being proposed is forty-two volts (42 v) with an open circuit battery voltage of 36.8 v. Going to a 42 v system would necessitate redesigning the electrical loads to a higher voltage or the use of a direct current (DC) to DC converter to convert the higher voltage to a lower 12.8 v.

Redesigning electrical loads for a higher voltage is generally not a problem for motors, relays and other components in a motor vehicle. However, the incandescent lamps are an exception. Redesigning the incandescent lamps for three times the voltage would necessitate going to nine times the resistance for the same wattage lamp. That would mean that the cross-sectional area of the lamp filament would have to be reduced by a factor of three and the length of the filament would have to be increased to three times. A disadvantage of the smaller filament diameter is that the incandescent lamp has a much shorter lamp life due to the effect of mechanical vibrations causing a smaller diameter lamp filament to break sooner. From the point of the life and durability of the incandescent lamp for motor vehicle applications, a lamp design for 12.8 v or better yet, one designed for 6.4 v, would be preferred by motor vehicle manufacturers in terms of lower warranty cost and higher customer satisfaction.

One attempt to overcome this disadvantage in a 42 v system for a motor vehicle is to use a DC-to-DC converter to convert the system voltage of 42 v down to the 12.8 v. In the motor vehicle, the total lamps or lighting load varies from around 300 watts to 600 watts. The cost of the DC-to-DC converter of this power rating is high. Also, there is an issue of additional size and weight of the DC-to-DC converter. As a result, it is desirable to operate or drive incandescent lamps with a high voltage source directly in a motor vehicle. It is also desirable to operate or drive 12.8 v incandescent lamps with a 38.4 v source in a motor vehicle. It is further desirable to enable incandescent lamps to be operated from a higher voltage source without the use of a DC-to-DC converter in a motor vehicle. Therefore, there is a need in the art to provide a system and method for operating incandescent lamps with a high voltage source in a motor vehicle, which meets these desires.

SUMMARY OF THE INVENTION

Accordingly, the present invention is a system and method for operating incandescent lamps with a higher voltage source than it was designed for in a motor vehicle. The system includes at least one pulse width modulation circuit having an incandescent lamp electrically connected to a high voltage source. The system also includes a generator electrically connected to the at least one pulse width modulation circuit for generating a pulse width modulation signal to modulate a voltage of the high voltage source to a voltage rating of the incandescent lamp.

One advantage of the present invention is that a new system and method for operating or driving incandescent lamps with a high voltage source is provided for a motor vehicle. Another advantage of the present invention is that the system and method enables 12.8 v rated incandescent lamps to be operated from a higher voltage source of 38.4 v without the use of a DC-to-DC converter to convert the voltage down to 12.8 v. Yet another advantage of the present invention is that the system and method uses a pulse width modulation (PWM) of the voltage supplied to the incandescent lamps to convert the voltage down to the rms voltage rating of the incandescent lamp. Still another advantage of the present invention is that the system and method provides a simpler and lower cost solution for powering the incandescent lamps in vehicle wherein a higher voltage system such as 38.4 v is in place and where a 12 v source is not available.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a schematic view of a pulse width modulation circuit for use with a system and method, according to the present invention.

FIG. 2 is a schematic view of a pulse width modulation system, according to the present invention, incorporating the pulse modulation circuit of FIG. 1.

FIG. 3 is a block diagram of another embodiment of a system, according to the present invention, for operating incandescent lamps with a relatively high voltage source in a motor vehicle.

DESCRIPTION OF THE PREFERRED EMBODIMENT(S)

Referring to the drawings and in particular FIG. 1, one embodiment of a pulse width modulation (PWM) circuit 10, according to the present invention, is illustrated for a motor vehicle (not shown). The PWM circuit 10 includes an incandescent lamp 12 having a filament 14. The incandescent lamp 12 has a voltage rating of 12.8 v and is conventional and known in the art. The filament 14 is connected to a relatively high voltage source 16 such as a battery (not shown) of the motor vehicle having a voltage rating higher than the voltage rating of the incandescent lamp 12. In this embodiment, the voltage source 16 is 38.4 v. The PWM circuit 10 also includes a PWM device 18 connected to the filament 14 of the incandescent lamp 12 and to ground 20. The PWM device 18 may be a power mosfet or other switching device to provide a pulse width modulated 42 v as a source to power the 12.8 v incandescent lamp 12. The PWM circuit 10 further includes a turn-on amplitude controller 22 electrically connected to the PWM device 18. The amplitude controller 22 produces a 100 Hz drive signal with a duty cycle of 12% for the power semiconductor switch of the PWM device 18. As illustrated, a duty cycle 24 has a maximum duty cycle of 12.5%, i.e., the incandescent lamp 12 is supplied with 42 v at about 12.5%, more preferably at about 11.8% to 12% to match the light output and color temperature of the same incandescent lamp operated at 12.8 v. It should be appreciated that the 100 Hz would be the lowest repetition rate, which would not, cause a perceptible light flickering of the incandescent lamp 12. It should also be appreciated that the selection of the repetition rate will depend on the tradeoffs of such factors as EMI, undesirable audibility from the electrical loads and switching losses in the PWM device 18. The range of repetition rate in typical operation is 100 Hz to 40 kHz. Any repetition rate greater than 40 kHz is possible, however, the switching loses may render its application inefficient.

Referring to FIG. 2, a pulse width modulation (PWM) system 30, according to the present invention, is illustrated for a motor vehicle (not shown). The PWM system 30 includes a plurality of the PWM circuits 10 arranged electrically in parallel with each other. In this embodiment, there are eight PWM circuits 10. The PWM system 30 includes an oscillator or wave generator 32 and a counter 34 electrically interconnecting the oscillator 32 and the amplitude controller 22. The oscillator 32 is a square wave generator for supplying a square wave of, but not limited to, 800 Hz. The counter 34 is of an octal type, which produces eight sequential output pulses with the required duty cycle of 12.5%. Each of these eight pulses are used to drive a power mosfet in the PWM device 18 of the PWM circuit 10 that turn the incandescent lamp 12 On and Off. It should be appreciated that the amount of power controlled by each power mosfet of the PWM device 18 would depend on the current rating of the mosfet used. It should also be appreciated that, for vehicle lighting applications, each of the PWM circuits 10 would be controlling about 70 watts (which would be sufficient for each filament of a headlamp, which is rated at 55W for the low beam and 65W for the high beam).

Referring to FIG. 3, another embodiment 40 of a pulse width modulation (PWM) system, according to the present invention, is illustrated for a motor vehicle (not shown). In this embodiment, the PWM system 40 includes at least one, preferably a plurality of the PWM circuits 10 arranged electrically in parallel with each other. In this embodiment, only one of the PWM circuits 10 is illustrated. The PWM system 40 replaces the oscillator 32 and counter 34 with an application specific integrated circuit or a micro-controller to be described. The PWM system 40 includes a current sensor 42 electrically interconnecting the PWM device 18 and the ground 20. The PWM system 40 also includes a voltage sensor 44 electrically interconnecting the filament 14 of the incandescent lamp 12 and the high voltage source 16. The PWM system 40 further includes a PWM generator 46 having a variable duty cycle electrically interconnecting the voltage sensor 44 and the current sensor 42. The PWM system 40 includes the amplitude controller 22 electrically interconnecting the PWM generator 46, PWM device 18 and the current sensor 42. The amplitude controller 22 produces a 100 Hz drive signal with a duty cycle of 12% for the power semiconductor switch of the PWM device 18. It should be appreciated that the theoretical duty cycle is 11.1%, but 12% was chosen to account for losses in the wiring and switching losses in the transistor.

In operation, the PWM system 40 performs a current limiting function during an initial turn On of the incandescent lamp 12 where the inrush current could be as high as six times the rated current. For example, for an industry standard low beam headlamp #9007, the peak current is about 26.2 ampere for the first 500 microseconds and the average current for the first 10 milliseconds is about 25 ampere. The current decay to the rated current is about 4.2 ampere after 250 milliseconds. The PWM system 40 operates the PWM circuit 10 with a constant duty cycle during the turn On phase and operates the PWM device 18 in a linear mode as such that the power and energy supplied to the incandescent lamp 12 is small during the start up phase and gradually increased to the rated value of the incandescent lamp 12 within a period of time, typically 100 to 200 millisecond. It should be appreciated that lamp life degrades in direct relation to how many times the incandescent lamp 12 was turned On which is then attributed to the inrush current.

To limit the inrush current to the incandescent lamp 12 during turn On, the PWM generator 46 modulates the amplitude of the PWM drive signal from the amplitude controller 22 to PWM device 18. By providing a PWM drive signal starting with an amplitude of zero and ramping the amplitude to a predetermined value (e.g., 5 v or any appropriate value) that is required to fully turn On the PWM device 18 over a time period of 0.1 seconds to 0.3 seconds or longer depending on its application. The PWM system 40 performs a current monitoring and current limiting functions. When over current of a predetermined amplitude occurs, the amplitude of the drive signal is reduced by the amplitude controller 22 to zero to turn Off the PWM device 18. The PWM system 40 provides a dimming function to the incandescent lamp 12 by decreasing the amplitude of the PWM drive signal by the amplitude controller 22 over a period of time from anywhere between 2 second to 5 second. The PWM system 40 performs a light output regulating function, varies lamp output directly with voltage, and varies vehicle system voltage from 12 v to 14.6 v (or 36 v to 45.8 v in a 42 v system). By monitoring the system voltage, the duty cycle generated by the PWM generator 46 may be varied or changed inversely proportional to the voltage, e.g. at 36 v the duty cycle could be 12.5% and at 45.8 volt the duty cycle is changed to 11%. It should be appreciated that, by varying the duty cycle in inverse proportion to the system voltage, constant power and therefore constant light output can be obtained from the incandescent lamp 12, thereby increasing the life of the incandescent lamps 12.

Accordingly, the present invention is applicable to any lamp circuit where a higher voltage than its rating is applied. For example, in current 12 v vehicle lighting systems, the present invention can be used for powering 6 v incandescent lamps or a 24 v truck electrical system can be used to power a 12 v incandescent lamp without any lamp burnout. It should be appreciated that the amplitude controller 22 can be applied to current 12 v vehicle lighting system to limit inrush current, thereby extending lamp life.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for operating incandescent lamps with a high voltage source in a motor vehicle comprising:
    at least one pulse width modulation circuit having an incandescent lamp electrically connected to a high voltage direct current source, the high voltage direct current source having a voltage rating higher than a voltage rating of said incandescent lamp; and
    a generator electrically connected to said at least one pulse width modulation circuit for generating a pulse width modulation signal to modulate a voltage of the high voltage direct current source reduced to the voltage rating of said incandescent lamp.

2. A system as set forth in claim 1 wherein said generator is a pulse width modulation generator.

3. A system as set forth in claim 1 wherein said generator has a variable duty cycle.

4. A system as set forth in claim 1 wherein said generator is a square wave generator.

5. A system as set forth in claim 4 wherein said square wave generator produces an 800 Hz square wave signal.

6. A system as set forth in claim 1 including a voltage sensor electrically interconnecting said incandescent lamp and said generator.

7. A system as set forth in claim 1 including a current sensor electrically interconnecting said pulse width modulation circuit and said generator.

8. A system as set forth in claim 1 wherein said incandescent lamp has a voltage rating of 12.8 v and the voltage source has a voltage of 42 v.

9. A system for operating incandescent lamps with a high voltage source in a motor vehicle comprising:
- at least one pulse width modulation circuit having an incandescent lamp electrically connected to a high voltage source;
- a generator electrically connected to said at least one pulse width modulation circuit for generating a pulse width modulation signal to modulate a voltage of the high voltage source to a voltage rating of said incandescent lamp;
- a current sensor electrically interconnecting said pulse width modulation circuit and said generator; and
- an amplitude controller electrically interconnecting said current sensor and said generator and said pulse width modulation circuit.

10. A system for operating incandescent lamps with a high voltage source in a motor vehicle comprising:
- at least one pulse width modulation circuit having an incandescent lamp electrically connected to a high voltage source;
- a generator electrically connected to said at least one pulse width modulation circuit for generating a pulse width modulation signal to modulate a voltage of the high voltage source to a voltage rating of said incandescent lamp; and
- wherein said at least one pulse width modulation circuit includes an amplitude controller and a pulse width modulation device electrically interconnecting said amplitude controller and said incandescent lamp.

11. A system for operating incandescent lamps with a high voltage source in a motor vehicle comprising:
- at least one pulse width modulation circuit having an incandescent lamp electrically connected to a high voltage source;
- a generator electrically connected to said at least one pulse width modulation circuit for generating a pulse width modulation signal to modulate a voltage of the high voltage source to a voltage rating of said incandescent lamp; and
- an octal counter electrically interconnecting said generator and said pulse width modulation circuit.

12. A method for operating incandescent lamps with a high voltage source in a motor vehicle, said method comprising the steps of:
- providing at least one pulse width modulation (PWM) circuit having an incandescent lamp electrically connected to a high voltage direct current source, the high voltage direct current source having a voltage rating higher than a voltage rating of the incandescent lamp;
- providing a generator electrically connected to the at least one pulse width modulation circuit; and
- generating a pulse width modulation signal from the generator and modulating a voltage of the high voltage direct current source and reducing the voltage to the voltage rating of the incandescent lamp.

13. A method as set forth in claim 12 including the step of limiting current to the incandescent lamp during an initial turn On of the incandescent lamp.

14. A method as set forth in claim 13 wherein said step of limiting comprises operating the PWM circuit with a constant duty cycle during the initial turn On.

15. A method as set forth in claim 14 including the step of operating a PWM device of the PWM circuit in a linear mode such that power and energy supplied to the incandescent lamp is small during the initial turn On and gradually increased to a rated value of the incandescent lamp within a period of time.

16. A method as set forth in claim 12 including the step of varying the duty cycle generated by the generator.

17. A method as set forth in claim 16 wherein said step of varying comprises varying the duty cycle by the generator inversely proportional to the voltage.

18. A method as set forth in claim 12 wherein said generator is a pulse width modulation generator.

19. A method for operating incandescent lamps with a high voltage source in a motor vehicle, said method comprising the steps of:
- providing at least one pulse width modulation (PWM) circuit having an incandescent lamp electrically connected to a high voltage source;
- providing a generator electrically connected to the at least one pulse width modulation circuit;
- generating a pulse width modulation signal from the generator and modulating a voltage of the high voltage source to a voltage rating of the incandescent lamp; and
- reducing an amplitude of the PWM signal by an amplitude controller to zero to turn Off a PWM device of the PWM circuit when over current of a predetermined amplitude occurs.

20. A method for operating incandescent lamps with a high voltage source in a motor vehicle, said method comprising the steps of:
- providing at least one pulse width modulation (PWM) circuit having an incandescent lamp electrically connected to a high voltage source;
- providing a generator electrically connected to the at least one pulse width modulation circuit;
- generating a pulse width modulation signal from the generator and modulating a voltage of the high voltage source to a voltage rating of the incandescent lamp; and
- dimming the incandescent lamp by decreasing an amplitude of the PWM signal by an amplitude controller over a period of time.

* * * * *